Patented June 4, 1940

2,203,504

UNITED STATES PATENT OFFICE 2,203,504

MANUFACTURE OF NEW UREA DERIVATIVES

Henry Alfred Piggott and John Donald Rose, Blackley, Manchester, England, assignors to Imperial Chemical Industries Limited, a corporation of Great Britain No Drawing. Application June 10, 1938, Serial No. 213,080. In Great Britain June 11, 1937

3 Claims. (Cl. 260—294)

This invention relates to the manufacture of new urea derivatives.

According to the invention amines of the general formula

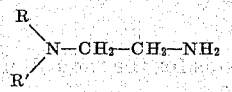

wherein R and R' stand for the same or different alkyl, cycloalkyl or aralkyl radicals or the grouping

as a whole stands for the radical of a heterocyclic secondary base, for example piperidine, morpholine or tetrahydroquinoline, are so treated that they are converted into ureas of the general formula

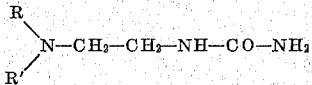

where R and R' have the same significance as before, the conversion being brought about by interaction of the said amines or their salts, preferably in aqueous solution, with cyanic acid, its salts or its derivatives, or with substances capable of reacting as cyanic acid under the conditions of reaction, e. g. its isomeride fulminic acid; or alternatively, by interaction of the said amines with reactive derivatives of urea, e. g. nitrourea or carbamyl chloride.

As suitable amines conforming with the general formula given above there may be mentioned, for example, as-dimethylethylenediamine, as-diethylethylenediamine, as-dibutylethylenediamine, and β-piperidylethylamine.

A suitable mode of carrying the invention into practical effect by the first mentioned procedure is to dissolve a neutral-reacting salt of the amine, e. g. the dihydrochloride, in water and gradually add a solution of potassium cyanate, care being taken to prevent free cyanic acid from hydrolysing before reacting with the amine by keeping the solution cold and adding alkali as necessary to keep the solution neutral; whereas by the second procedure nitrourea is conveniently added to an aqueous solution of the amine, and the solution is then heated until reaction is complete, as is shown by there being no more evolution of gas.

The products thus obtained are highly basic substances which give water-soluble salts with acids. They or their salts are useful for textile treatment purposes or as intermediates in the manufacture of synthetic resins and medicinal substances.

The invention is illustrated but not limited by the following examples in which the parts are by weight.

Example 1

20 parts of nitrourea is slowly added to a solution of 8 parts of unsymmetrical dimethylethylenediamine in 50 parts of water at room temperature. The solution obtained is then heated to boiling in a vessel provided with a reflux condenser and the heating is continued for 2 hours, gas being evolved. When the evolution of gas ceases the solution is evaporated under sub-atmospheric pressure. When the water is removed there remains a colourless resinous mass. This, the new urea derivative of formula $(CH_3)_2N-CH_2-CH_2-NH-CO-NH_2$ readily dissolves in water and diluted acids.

Example 2

40 parts of β-piperidylethylamine (see Journal of The American Chemical Society, 1933, vol. 55, page 4170) are dissolved in 150 parts of water and the solution so obtained is heated to 90°–100° C. 25 parts of nitrourea are then gradually added, whereupon effervescence occurs and nitrous oxide is evolved. When the effervescence has ceased the solution is heated under reflux for 1 hour and is then evaporated to dryness under diminished pressure at 60° C. The residue, which is a hard white crystalline mass, is recrystallised from a mixture of alcohol and ether. There is thus obtained β-piperidylethylurea in the form of white highly hygroscopic crystals of M. P. 88° C. The compound is readily soluble in water.

Example 3

135 parts of a solution containing 35 parts of 10N hydrochloric acid dissolved in 100 parts of water are slowly added to 25 parts of β-piperidylethylamine, the mixture being kept cool. 29 parts of potassium cyanate are gradually added and the mixture is boiled for 1 hour under a reflux condenser. The solution so obtained is then evaporated to dryness under diminished pressure. To the residue there are added 100 parts of absolute alcohol and the mixture so obtained is boiled and filtered hot to remove potassium chloride. The filtrate is evaporated to dryness under diminished pressure and the pale brown viscous syrup remaining is allowed to stand in an evacuated vessel, whereupon it crystallises, giving highly hygroscopic crystals of β-piperidylethylurea, M. P. 88°.

*Example 4*

To a mixture of 15 parts of as-dibutylethylenediamine and 50 parts of water, heated to 60° C., sufficient ethyl alcohol is added to give a clear solution. The liquid is then maintained at 60° C. while 15 parts of nitrourea are gradually added. A vigorous reaction sets in, effervescence occurs and nitrous oxide is evolved. When the effervescence has ceased the liquid is boiled for 1 hour under a reflux condenser. The liquid is then cooled and the solvent is removed by distillation under diminished pressure. The oily residue remaining is well washed with ether and is then dried by being allowed to stand for 24 hours in an evacuated vessel. There is thus obtained β-dibutylamino-ethylurea in the form of a pale yellow viscous liquid which is readily soluble in alcohol or in water, but insoluble in ether.

As-dibutylethylenediamine may conveniently be made by causing dibutylamine, formaldehyde, sodium bisulphite and sodium cyanide to react together in aqueous medium and subsequently reducing the dibutylaminoacetonitrile so obtained with sodium and alcohol.

We claim:

1. A process for the manufacture of new urea derivatives which comprises causing an amine having the general formula:

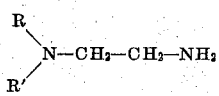

wherein the grouping

as a whole stands for the radical of a secondary amine selected from the group consisting of heterocyclic secondary bases and secondary amines in which R and R' represent radicals selected from the group consisting of alkyl radicals, cycloalkyl radicals, and aralkyl radicals to react with a reactive derivative of urea selected from the group consisting of nitrourea and carbamyl chloride.

2. A urea derivative having the general formula:

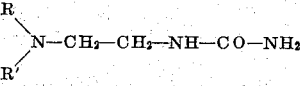

wherein the grouping

as a whole stands for the radical of a heterocyclic secondary base.

3. Beta piperidylethylurea which has the formula:

HENRY ALFRED PIGGOTT.
JOHN DONALD ROSE.